United States Patent Office 3,279,452
Patented Oct. 18, 1966

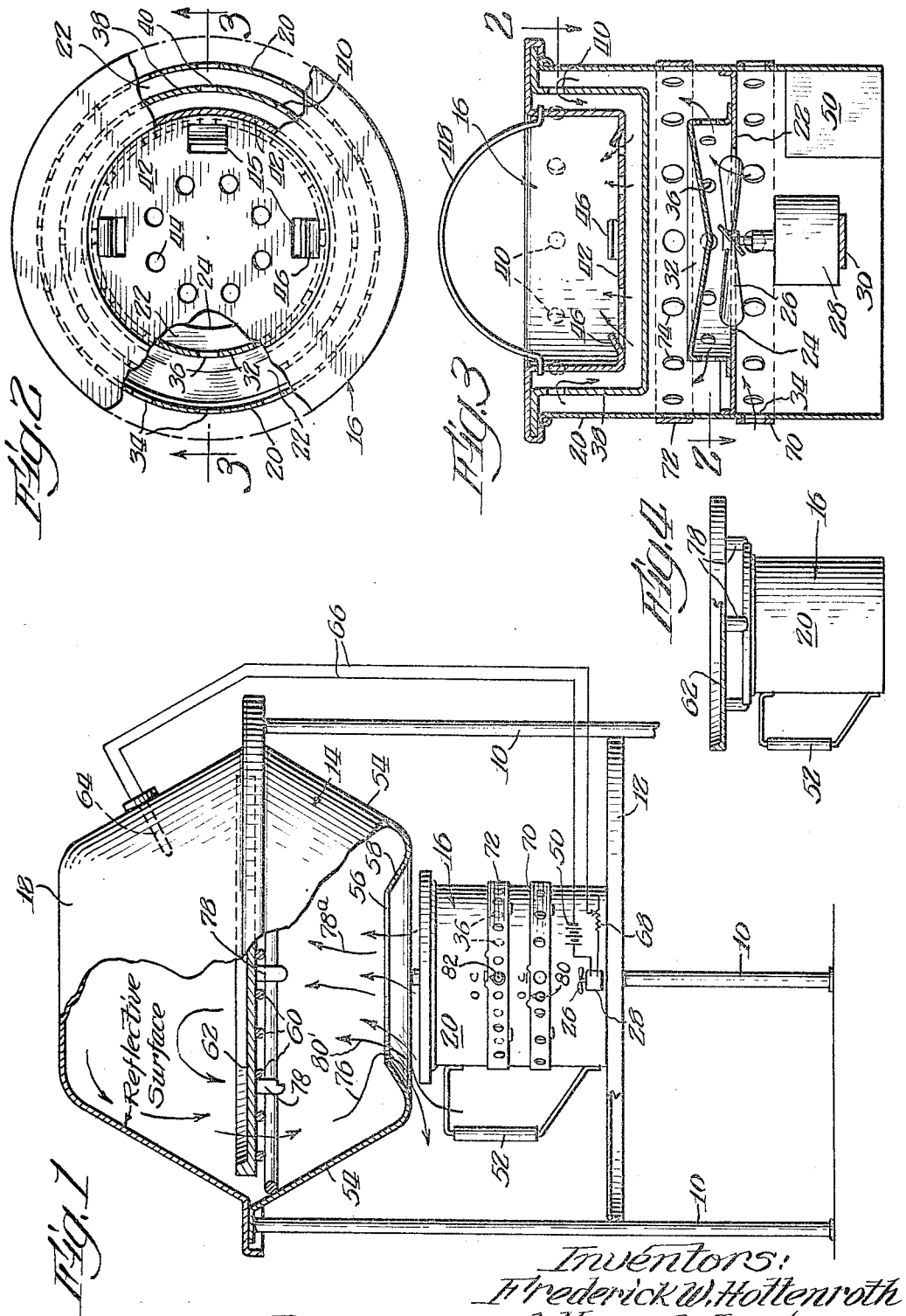

3,279,452
FORCED DRAFT SOLID CARBON FUEL BURNING COOKER
Frederick W. Hottenroth, Palos Verdes Peninsula, and Harry D. Jacoby, Palos Verdes Estates, Calif., assignors to Z.Z. Corporation, Torrance, Calif., a corporation of California
Filed Sept. 14, 1964, Ser. No. 396,186
13 Claims. (Cl. 126—25)

This invention relates to a forced draft solid carbon fuel burning cooker comprising a burner and means for supporting a cooking surface above the burner.

One object of the invention is to provide a forced draft burner suitable for efficiently burning solid carbon fuel such as charcoal, petroleum coke, or the like, and which burns the fuel under control conditions.

Another object is to provide a quick starting cooker of the character disclosed which is ready to cook in a few minutes and requires no lighter fluid.

Still another object is to provide a cooker which has a high heat output, is economical in fuel consumption and is a general purpose device suitable for boiling, broiling, frying, grilling and spot heating.

A further object is to provide a forced draft cooker so designed that no external power source is required yet the device is low in cost and light in weight.

Still a further object is to provide means for supporting a cooking surface above the burner in the form of a truncated cone-shaped casing having a central opening in its lower end spaced above the burner in such manner as to secured maximum efficiency of operation and certain advantages for concentrating the heat on the objects being cooked yet an air circulation pattern which keeps the casing and a cover therefor comparatively cool.

An additional object is to provide a cover for the casing which has a heat reflective inner surface so as to further increase efficiency and reduce surface temperature of the cover.

Another additional object is to provide a burner so designed that it has comparatively cool walls yet a comparatively hot burner pot when in operation, the design being such that efficient extinction of the fire is possible by water-flooding the fuel, without however damaging the burner, which permits removal of the burner pot in such manner that the ashes and water can be poured therefrom and the pot flushed with water for ease of cleaning preparatory to subsequent use of the burner.

A further additional object is to provide the casing so arranged that it effectively traps grease drippings from the food being cooked and which can subsequently be readily removed in a convenient manner.

Further objects are to provide damper arrangements for the burner during the time that the forced draft mechanism is at rest, and thermostatic control for the fan in response to the heat generated by the burner.

With these and other objects in view, our invention consists in the construction, arrangement and combination of the various parts of our forced draft solid carbon fuel burning cooker, whereby the objects above contemplated are attained, as hereinafter more fully set forth, pointed out in our claims and illustrated in detail on the accompanying drawing, wherein:

FIG. 1 is a side elevation partly in section showing a forced draft solid carbon fuel burning cooker embodying our invention, portions thereof being broken away and other portions shown in section;

FIG. 2 is an enlarged plan view thereof partly in section;

FIG. 3 is a vertical sectional view on the line 3—3 of FIG. 2, the sectioned portions of FIG. 2 being taken on the line 2—2 thereof; and FIG. 4 is a side elevation on a reduced scale showing a modified type of cooking surface supported on the burner.

On the accompanying drawing we have used the reference numeral 10 to indicate supporting legs for a shelf 12 and a casing shown generally at 14. A burner is shown generally at 16 of the general type disclosed in our Patents Nos. 3,159,119, 3,191,556 and 3,219,024, but has improved features of construction thereover. A cover 18 is also provided for the casing 14. The legs 10 may be wheel mounted if ready portability is desired.

The burner 16 comprises a cylindrical housing 20 open at its top and provided with a horizontal separator plate 22. The separator plate has a central opening 24 in which a fan 26 is rotatable, being driven by an electric motor 28 mounted on a support 30.

A directive shield 32 is arranged within the housing 20 above the separator plate 22 and has its peripheral edge spaced inwardly from the wall of the housing 20 to permit air flow from atmosphere through air flow openings 34 in the housing 20, the opening 24 in the separator plate 22 and air flow openings 36 in the directive shield plate as induced by rotation of the fan 26, and as illustrated in FIG. 3.

Above the directive shield 32 a burner outer shell 38 is provided having a side wall spaced from the wall of the housing 20 and provided with air flow openings 40 adjacent the top thereof. Within the shell 38 a burner pot 42 is provided having a side wall spaced from the side wall of the burner outer shell and having a bottom wall provided with air flow openings 44 and 45 constituting a grate for fuel. The openings 45 adjacent the side wall of the burner pot are advantageously provided with deflecting tabs 46 to deflect the air flow toward the center of the burner pot. The burner outer shell and the burner pot constitute a sub-assembly removably positioned with respect to the housing 20 for clean-out purposes as will hereinafter appear, and for this purpose may be provided with a bale 48 shown in FIG. 3 for lifting the sub-assembly from the housing.

Within the housing 20 a battery 50 may be provided for energizing the fan motor 28. As shown in FIG. 1, a handle 52 may be provided for convenience in handling the entire burner 16.

The casing 14 comprises a truncated cone-shaped wall 54 having its larger end uppermost and a central opening 56 in its lower end. The marginal edge of this opening extends upwardly and inwardly as shown at 58.

Within the upper end of the casing 14, a grate 60 of wire elements or the like is provided to support food and/or cooking utensils. A griddle 62 may also be supported on the grate if desired. The cover 18 has a heat reflective surface to conserve heat, to aid in keeping the outside surface of the cover cool and to direct radiant heat on the food being cooked.

In FIG. 1 the motor 28 and the battery 50 are shown in electro-diagrammatic form, and the cover 18 is shown provided with a thermostat 64 responsive to the temperature within the cover and connected by flexible wires 66 to the battery and the motor. A rheostat-switch 68 may also be provided to vary the speed of the motor 28 as desired and to cut off the current when desired.

When the motor 28 and therefore the fan 26 are at rest, air is trapped by the arrangement of burner outer shell and its openings 40 as well as the rest of the air path disclosed to avoid a chimney effect. The burner then drops quickly to a low heat output. This is particularly advantageous when the burner is controlled thermostatically because the heat output responds quickly to "on" and "off" operation of the fan motor.

Another method of varying heat output is by means of either a normally open damper 70 for the openings 34 or a normally closed bypass damper sleeve 72 for openings 74 in the wall 20 between the directive shield 32 and the burner outer shell 38. The damper sleeve 70 may be operated to close off the air input to the fan or to partially close it if desired while the damper 72 may be opened to vent thermally moved air to atmosphere while keeping the motor cool, and may be partially opened if desired for varying the degree of air bypass. FIG. 1 illustrates a control knob 80 for the damper 70 and a control knob 82 for the damper 72.

The burner 16 may be quickly started by wrapping a charge of charcoal or the like in paper, placing it in the burner pot and igniting the paper. The fan motor is energized and in a few minutes the fuel is burning with an intense heat because of the forced draft.

The air for combustion is drawn through the openings 34 under the separator plate 22 and passes under the directive shield 32, discharging through the openings 36 into the housing 20 above the directive shield. This air then flows up the side wall of the housing 20 to keep it comparatively cool all the way up to its top edge where the air enters through the openings 40 into the space between the side walls of the burner outer shell and the burner pot itself. In this space the air becomes preheated before entering through the bottom openings 44 and 45 to furnish oxygen to the burning fuel. The arrangement thereby both preheats the air and provides a double wall of intermediate temperature air between the inside of the burner pot and the outer wall of the housing 20 to keep it comparatively cool. The flow of air is thus directed in such a way that it protects the various parts of the burner from reaching excessive temperatures when the fan motor 28 is energized.

A burner of the type disclosed has a high heat output —about 30,000 B.t.u. per hour in a burner in which the housing 20 is about 8" high and 8" in diameter. This is about four times the output of the largest burner on most gas and electric ranges and ten times the heat output of most portable outdoor cookers. This heat output is obtained with an expenditure of only about two pounds of charcoal per hour yet the burner itself is of small size and weighs less than five pounds.

The fire in the burner pot may be quickly extinguished after usage by pouring a small amount of water directly over the burning charcoal. It is even possible to flood the charcoal with water up to a level slightly below the openings 40 since the bottom of the burner outer shell holds water up to the openings. This construction also traps live and dead ashes for safety and cleanliness as the ashes can be readily removed by flushing with water after the sub-assembly of burner outer shell and burner pot have been removed from the housing 20 by using the bale 48.

From the foregoing specification it will be obvious that we have provided a combination charcoal burner, support therefor (on the shelf 12) and heat controlling means in the form of the casing 14 and the cover 18 making the device adaptable for general purpose cooking. Meats or other food may be placed directly on the grate 60 or on the griddle 62 for broiling, frying etc. The intense heat of the forced draft charcoal makes this type of cooking practical. Charcoal barbecue stoves without forced draft are generally too slow for satisfactory cooking of this nature.

As heated air enters the cooking space within the casing 14 from the burner 16 when the cover 18 is in place, space is provided between the casing and particularly its portion 58 and the upper edge of the burner for colder heavier air to exit as indicated by the arrows 76 (FIG. 1). Arrows 78a indicate the hot air coming upwardly from the burner and arrows 80' indicate additional air entering by Venturi action with the hot air and this spreads the heat more evenly towards the periphery of the grate 60 when the cover 18 is removed. The top of the burner being slightly lower than the bottom of the casing 14 permits the entire burner to be withdrawn as desired for refueling without disturbing any cooking operation which might be in progress.

The cover 18 transforms the device into an oven for use when roasting meats, baking, etc. The cover is also helpful when doing other forms of cooking on cold or windy days. The inside of the cover being reflective, reflects the radiant rays from the glowing charcoal to the surface of the meat. This speeds up the cooking and enhances the flavor.

The thermostat 64 automatically controls the cooking temperature. Its sensing element is placed so as to sense the temperature of the oven and turns the blower off and on as required to maintain the desired temperature. The thermostat can be short-circuited if desired and the rheostat 68 used to control the speed of the motor and thereby the cooking speed, or can be used in conjunction with the thermostat.

In FIG. 4 we illustrate how the burner 16 may be set up for small cooking jobs and even operated on a bridge table or the like. The griddle 62 is shown as having supporting legs 78 for direct mounting on the flange around the upper edge of the burner 16, or a grate instead of the griddle may be mounted in this manner. When the griddle 62 is mounted on the grate 60 in FIG. 1, the legs extend downwardly through interstices of the grate.

From the foregoing specification it will be obvious that we have provided a versatile type of cooker in which a burner is removably mounted and includes a number of novel constructional features for securing maximum efficiency for either a barbecue type of operation as shown in FIG. 1 or table top cooking as shown in FIG. 4.

Some changes may be made in the construction and arrangement of the parts of our forced draft solid carbon fuel burning cooker without departing from the real spirit and purpose of our invention, and it is our intention to cover by our claims any modified forms of structure or use of mechanical equivalents which may reasonably be included within their scope.

We claim as our invention:

1. In a forced draft solid carbon fuel burning cooker, a burner comprising an open top housing having a vertical outer wall, a forced draft fan discharging into said housing, a burner outer shell depending into said housing, a burner pot in said burner outer shell having a bottom wall spaced above the bottom of said outer shell and a side wall spaced from the side wall of said outer shell, said side wall of said burner outer shell having openings adjacent the top thereof for entry of air from said housing, said burner pot having openings in the bottom wall thereof constituting a grate for the burning fuel, and means for supporting a cooking surface above said burner.

2. A forced draft solid carbon fuel burning cooker according to claim 1 wherein said burner outer shell and said burner pot constitute a removable sub-assembly with respect to said housing.

3. A forced draft solid carbon fuel burning cooker according to claim 1 wherein some of said openings in the bottom of said burner pot adjacent the side wall thereof have means to direct the air flow toward the center of the pot.

4. A forced draft solid carbon fuel burning cooker according to claim 1 wherein said last means comprises a truncated cone-shaped casing having its larger end uppermost and a central opening in its lower end spaced above said burner, and a supporting surface adjacent its larger end for food and/or cooking utensils.

5. A forced draft solid carbon fuel burning cooker according to claim 1 wherein said last means comprises a truncated cone-shaped casing having its larger end uppermost and a central opening in its lower ends spaced above said burner, the marginal edge thereof being inclined upwardly and inwardly adjacent the peripheral edge of the upper end of said burner.

6. A forced draft solid carbon fuel burning cooker according to claim 4 wherein a domed cover is provided for said casing which has a heat reflective inner surface.

7. A forced draft solid carbon fuel burning cooker according to claim 1 wherein an electric motor is provided for rotating said fan, and a thermostat is responsive to the heat generated by said burner and is operative to control the energization of said electric motor.

8. A forced draft solid carbon fuel burning cooker according to claim 6 wherein an electric motor is provided for rotating said fan, and a thermostat is responsive to the heat generated by said burner and is operative to control the energization of said electric motor.

9. A forced draft solid carbon fuel burning cooker according to claim 1 wherein said forced draft fan is located in said housing below the bottom of said burner outer shell, and a separator plate surrounds the fan blade of said forced draft fan and has a central opening in which said fan blade is located.

10. A forced draft solid carbon fuel burning cooker according to claim 9 wherein a normally open damper is provided between atmosphere and said opening of said separator plate to cut off the flow of air to said burner when said fan is at rest and said damper is closed.

11. A forced draft solid carbon fuel burning cooker according to claim 1 wherein a horizontal separator plate is provided in said housing below said burner pot and has a central opening to receive the air from said fan, a directive shield is provided above said opening for spreading the air therefrom toward said vertical outer wall of said housing and the outer edge of said directive shield is spaced from said outer wall to permit upward flow of the air past said separator plate.

12. A forced draft solid carbon fuel burning cooker according to claim 1 wherein a directive shield is located in said housing between said forced draft fan and the bottom of said burner outer shell.

13. A forced draft solid carbon fuel burning cooker according to claim 12 wherein a normally closed damper is provided between atmosphere and the space in said housing between said directive shield and said burner outer shell to by-pass the flow of air from said directive shield to atmosphere when said fan is at rest and said damper is open.

References Cited by the Examiner

UNITED STATES PATENTS

| | | |
|---|---|---|
| 2,608,190 | 8/1952 | Winning et al. |
| 2,929,373 | 3/1960 | Bernstein et al. _____ 126—21 |
| 2,943,557 | 7/1960 | Suehlsen. |
| 3,119,386 | 1/1964 | Farro _____ 126—25 |
| 3,191,590 | 6/1965 | Haley _____ 126—19 |

FREDERICK KETTERER, *Primary Examiner.*